US012731802B2

(12) United States Patent
Han

(10) Patent No.: US 12,731,802 B2
(45) Date of Patent: Sep. 8, 2026

(54) METHOD OF CONTROLLING A COOLING FAN FOR A FUEL CELL STACK

(71) Applicants: HYUNDAI MOTOR COMPANY, Seoul (KR); KIA CORPORATION, Seoul (KR)

(72) Inventor: Wook Hyun Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 596 days.

(21) Appl. No.: 18/237,742

(22) Filed: Aug. 24, 2023

(65) Prior Publication Data

US 2024/0405239 A1 Dec. 5, 2024

(30) Foreign Application Priority Data

May 30, 2023 (KR) ........................ 10-2023-0068873

(51) Int. Cl.
*H01M 8/04701* (2016.01)
*H01M 8/04014* (2016.01)
(Continued)

(52) U.S. Cl.
CPC ... *H01M 8/04723* (2013.01); *H01M 8/04014* (2013.01); *H01M 8/04029* (2013.01); *H01M 8/04358* (2013.01); *H01M 8/04619* (2013.01); *H01M 8/04626* (2013.01); *H01M 8/04679* (2013.01); *H01M 8/04768* (2013.01); *H01M 8/04947* (2013.01)

(58) Field of Classification Search
CPC ......... H01M 8/04768; H01M 8/04014; H01M 8/04029; H01M 8/04358; H01M 8/04619; H01M 8/04679; H01M 8/04723; H01M 8/0494; H01M 8/04649
See application file for complete search history.

(56) References Cited

U.S. PATENT DOCUMENTS 10,505,209 B2 * 12/2019 Jeong .................. H01M 8/0432
11,450,873 B2 9/2022 Won et al.
(Continued)

FOREIGN PATENT DOCUMENTS

| JP | 6456261 B2 | 1/2019 |
|---|---|---|
| JP | 6948270 B2 | 10/2021 |
| KR | 20220096151 A | 7/2022 |

*Primary Examiner* — Mong-Shune Chung
(74) *Attorney, Agent, or Firm* — Lempia Summerfield Katz LLC

(57) ABSTRACT

A method of controlling a cooling fan can maximize available stack power through optimal duty control of the cooling fan by considering deterioration of a fuel cell stack. The method includes determining whether a duty map update condition is satisfied based on a state variable for cooling fan control; when the duty map update condition is satisfied, determining available power of a fuel cell stack for each cooling water temperature corresponding to a current fuel cell stack deterioration using a detected cooling water temperature; determining a target cooling water temperature at which available power of the fuel cell stack is maximized from the determined available power of the fuel cell stack for each cooling water temperature; and then updating a cooling fan duty map using the determined target cooling water temperature.

16 Claims, 6 Drawing Sheets

(51) Int. Cl.

| | |
|---|---|
| ***H01M 8/04029*** | (2016.01) |
| ***H01M 8/0432*** | (2016.01) |
| ***H01M 8/04537*** | (2016.01) |
| ***H01M 8/04664*** | (2016.01) |
| ***H01M 8/04746*** | (2016.01) |
| ***H01M 8/04858*** | (2016.01) |

(56) References Cited

U.S. PATENT DOCUMENTS

| | | | | |
|---|---|---|---|---|
| 2003/0198848 | A1* | 10/2003 | Yang ................. | H01M 8/04089 429/410 |
| 2019/0165398 | A1* | 5/2019 | Park .......................... | B60L 7/10 |
| 2021/0111423 | A1* | 4/2021 | Lee ................... | H01M 8/04029 |
| 2022/0209265 | A1 | 6/2022 | Won et al. | |

* cited by examiner

FIG. 1 – Prior Art
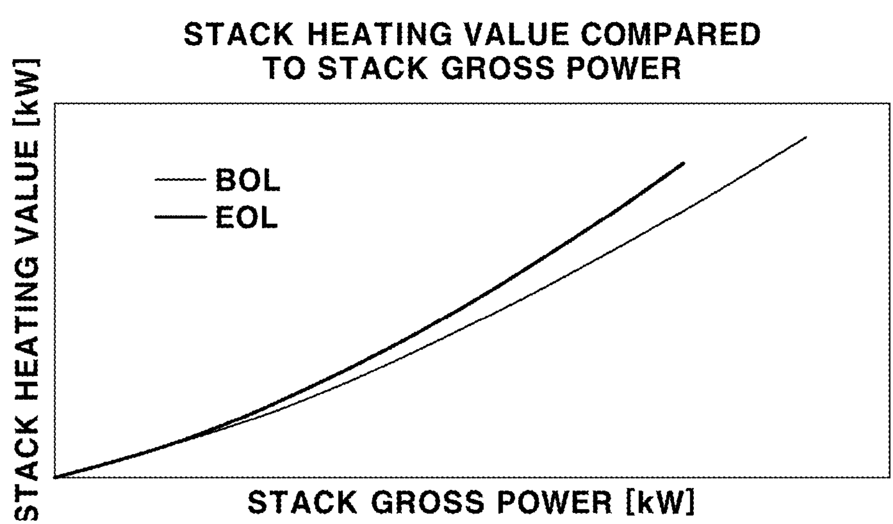
FIG. 2 – Prior Art
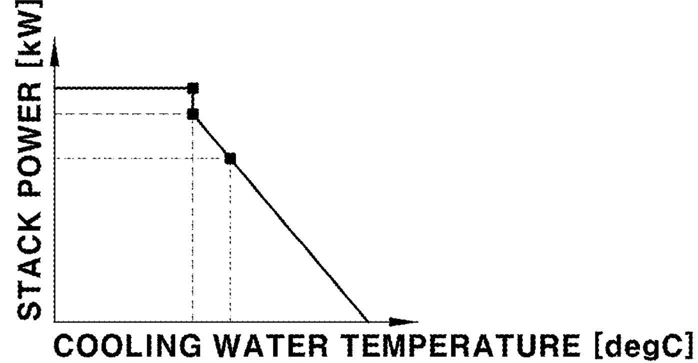

FIG. 3 – Prior Art
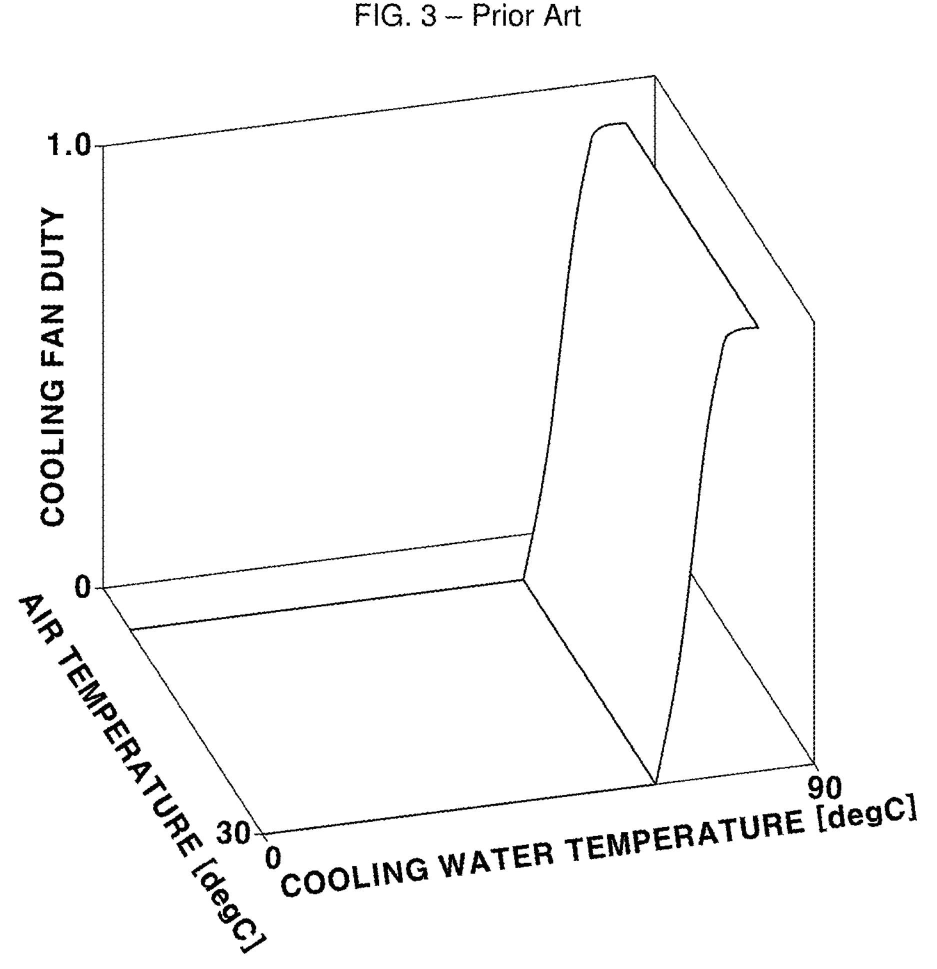

FIG. 4 – Prior Art
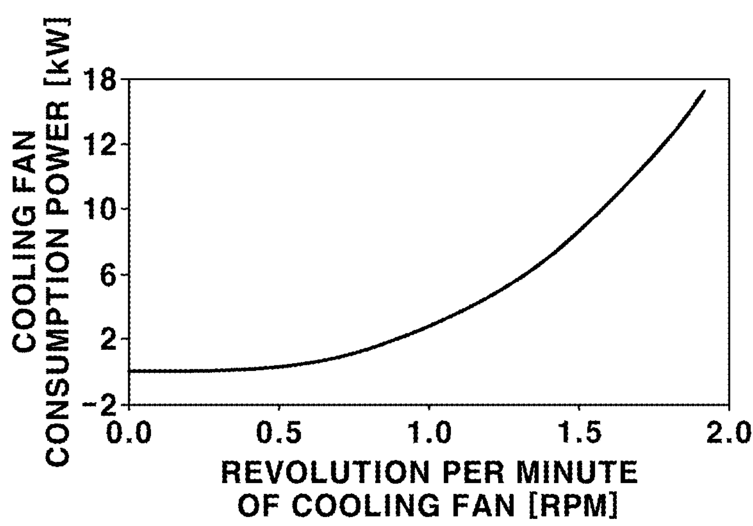

11

20

30

AIR TEMPERATURE SENSOR

CONTROLLER

COOLING FAN (FAN MOTOR)

WATER TEMPERATURE SENSOR

12

METHOD OF CONTROLLING A COOLING FAN FOR A FUEL CELL STACK

CROSS-REFERENCE TO RELATED APPLICATION

This application claims under 35 U.S.C. § 119 (a) the benefit of priority to Korean Patent Application No. 10-2023-0068873 filed on May 30, 2023, the entire contents of which are incorporated herein by reference.

BACKGROUND

(a) Technical Field

The present disclosure relates to a method of optimally controlling a cooling fan for cooling water heat dissipation in a cooling system for cooling a fuel cell stack.

(b) Background Art

A fuel cell system installed in a hydrogen fuel cell vehicle, belongs to the category of eco-friendly vehicles. The fuel cell system includes a fuel cell stack for generating electric energy from an electrochemical reaction involving reaction gases (hydrogen as a fuel gas and oxygen as an oxidant gas). The fuel cell system also includes a hydrogen supply device for supplying hydrogen to the fuel cell stack, an air supply device for supplying air containing oxygen to the fuel cell stack, and a thermal management system for controlling an operating temperature of the fuel cell stack. The fuel cell system also includes a controller for controlling the overall operation of the fuel cell system.

In the fuel cell system, the hydrogen supply device includes a hydrogen storage (a hydrogen tank), a hydrogen supply line, a fuel cut-off valve, a fuel supply valve, a pressure sensor, and a hydrogen recirculation device. In addition, the air supply device includes an air supply line, an air blower or air compressor, a humidifier, and an air cut-off valve. The thermal management system includes a cooling water pump, a cooling water reservoir, a radiator, a three-way valve, an ion filter, and a cooling water heater.

The controller controls a hydrogen supply pressure by controlling an opening degree of the fuel supply valve. The controller also controls driving of the air compressor or air blower and the cooling water pump. Additionally, the controller controls other valves in the system.

Any unreacted hydrogen that remains after the reaction within the fuel cell stack is either discharged to the outside through an outlet of an anode (a hydrogen electrode or a fuel electrode) or recycled to an inlet of the anode of the fuel cell stack by the hydrogen recirculation device.

In addition, a purge valve for purging the anode is installed at an exhaust line of the anode of the fuel cell stack. Foreign materials such as nitrogen and water are discharged and removed from the anode of the fuel cell stack together with hydrogen by opening and closing the purge valve periodically, and in this way, a hydrogen utilization rate is increased.

In order to maintain efficient operation and durability of the fuel cell system, cooling control of the fuel cell stack is essential. For example, when a temperature of the fuel cell stack (a cooling water temperature) reaches a high temperature that is greater than or equal to a set temperature, a normal current output is not possible. Thus, a power limit operation is inevitably performed.

In order to minimize the power limit operation, the fuel cell system includes the thermal management system for controlling a temperature of the fuel cell stack. The thermal management system includes a water cooling type cooling system which uses cooling water to cool and heat the fuel cell stack.

The water cooling type cooling system forms a cooling loop or a heating loop for circulating the cooling water according to the temperature of the fuel cell stack. For example, in a high-temperature heating situation of the fuel cell stack, the cooling loop is formed to circulate low-temperature cooling water, which releases heat while passing through a radiator, to the fuel cell stack.

On the other hand, when heating of the fuel cell stack, such as for cold starting, is required, the heating loop is formed to supply cooling water discharged from the fuel cell stack back to the fuel cell stack using a cooling water pump. When more rapid heating is required, a heater for heating the cooling water is used.

In a typical fuel cell system, in order to control a flow rate of the cooling water circulating along the cooling water line, the controller controls the revolutions per minute (RPM) of the cooling water pump for circulating the cooling water. In this case, it is necessary to control the flow rate of the cooling water by reflecting an operating state of the fuel cell stack as close as possible to an actual state.

Recently, in control of the fuel cell system, since a fuel cell operating condition tends to shift toward a high temperature and low humidity condition, cooling control of the fuel cell stack becomes more important.

A cooling system for controlling a temperature of a fuel cell stack may be different for each vehicle in a detailed configuration. However, there is no difference in a basic configuration including a radiator, a cooling fan, a cooling water pump, and a cooling water line.

Further describing the cooling of the fuel cell stack, FIG. 1 is a diagram illustrating a stack heating value according to a stack use in a known fuel cell system. The diagram of FIG. 1 shows a comparison of heating value states according to stack power at beginning of life (BOL) and end of life (EOL) of the fuel cell stack.

A durability state of the fuel cell stack changes from BOL to EOL as the fuel cell stack is used. As stack power (gross power) increases, stack heat generation increases, and when the durability state goes from BOL to EOL, the stack heat generation further increases compared to BOL under the same operating condition. Even a load for stack driving is similar to the above-described aspect of the stack durability state and the stack heating value according to deterioration.

FIG. 2 is a diagram illustrating a state in which stack power is limited according to a cooling water temperature. The diagram shows a derating map which can be used to limit the stack power according to the cooling water temperature.

Generally, in order to secure durability of the fuel cell stack, when the cooling water temperature rises to a predetermined temperature, control is performed to forcibly lower the stack power. In addition, when the stack power limit is being performed, a battery can provide additional power to drive the vehicle due to the decrease in the stack power. However, when the power is still insufficient, normal vehicle driving becomes impossible.

During the cooling control of the fuel cell stack, a fan speed, i.e., an RPM of a cooling fan, is controlled according to an air temperature and a cooling water temperature. FIG. 3 is a diagram illustrating an example of a duty map for controlling the RPM of the cooling fan. The duty map shows an example in which a cooling fan duty is set according to an air temperature and a cooling water temperature.

A duty value according to a current air temperature and a current cooling water temperature is determined using the duty map shown in FIG. 3. Pulse width modulation (PWM) control is performed on a fan motor of the cooling fan according to the determined duty value so that the RPM of the cooling fan is controlled.

In this case, consumption power by the cooling fan is increased in the form of an exponential function as the RPM of the cooling fan increases. FIG. 4 is a diagram illustrating consumption power according to the RPM of the cooling fan.

A problem according to the related art is that the duty map for controlling the RPM of the cooling fan for cooling the stack is set to one as shown in FIG. 3. However, a heating value and an air temperature situation continuously changes.

In other words, when the fuel cell stack is deteriorated (from BOL to EOL) and thus the stack heating value increases, a duty of the cooling fan should be changed so that the cooling water temperature can be adjusted according to the situation. However, such a function and control does not currently exist.

As described above, when the cooling water temperature rises to a predetermined temperature or more, the logic is used to reduce the stack heat generation and protect the stack by reducing the stack power as shown in FIG. 2. In this case, as the RPM of the cooling fan is increased for cooling the stack (i.e., as the duty for the PWM control is increased), the consumption power by the cooling fan significantly increases.

Thus, when the cooling fan duty is increased to blindly lower the cooling water temperature, cooling fan consumption becomes excessive. Conversely, when the temperature rise of the cooling water is left unchecked, the fuel cell stack cannot produce normal power.

In a specific situation such as BOL, it is possible to optimize the cooling fan duty. However, while the fuel cell stack is continuously deteriorated to EOL, an initial duty map is inadequate to maximize available power of the stack.

In addition, the deterioration of the fuel cell stack while the vehicle is traveling cannot be specified because the deterioration varies according to a driving habit of the driver or driving characteristics of each vehicle (e.g., harsh driving or gentle driving).

SUMMARY

The present disclosure has been made in an effort to solve the above-described problems associated with prior art.

Therefore, in view of the foregoing, a technology capable of maximizing the available power of the fuel cell stack by autonomously determining current deterioration of the fuel cell stack is required. To this end, a technology capable of optimizing the cooling fan duty according to the deterioration of the fuel cell stack is required.

In one aspect, the present disclosure provides a method of controlling a cooling fan, which can maximize available stack power through optimal duty control of the cooling fan by considering deterioration of a fuel cell stack.

Objectives of the present disclosure are not limited to the above-described objectives. The objectives of the present disclosure should become more apparent from the following description and are implemented by the means described in the appended claims and a combination thereof.

In an embodiment, the present disclosure provides a method of controlling a cooling fan for a fuel cell stack. The method includes determining, by a controller, whether a predetermined duty map update condition is satisfied based on a state variable for cooling fan control during driving of a cooling fan for cooling water heat dissipation of a fuel cell stack. The method also includes, when the duty map update condition is satisfied, determining, by the controller, available power of the fuel cell stack for each cooling water temperature corresponding to a current fuel cell stack deterioration. The current fuel cell stack deterioration corresponds to current fuel cell stack deterioration based on a current cooling water temperature and set data for each fuel cell stack deterioration. The method also includes determining, by the controller, a target cooling water temperature at which available power of the fuel cell stack is maximized from the determined available power of the fuel cell stack for each cooling water temperature. The method also includes updating, by the controller, a cooling fan duty map for pulse width modulation (PWM) control of the cooling fan using the target cooling water temperature at which the determined available power of the fuel cell stack is maximized.

Determining whether the duty map update condition is satisfied may include determining whether a current cooling fan duty for cooling fan control reaches a set duty. Determining whether the duty map update condition is satisfied may also include, when the current cooling fan duty reaches the set duty, comparing the current cooling water temperature as the state variable with a target cooling water temperature corresponding to the set duty on a current cooling fan duty map. Additionally, determining whether the duty map update condition is satisfied may include, when the current cooling water temperature exceeds the target cooling water temperature, determining that the duty map update condition is satisfied.

In addition, the cooling fan duty map may be a map in which the cooling fan duty is set to a value according to the state variable. In the cooling fan duty map, the state variable may include an air temperature detected by an air temperature sensor and a cooling water temperature detected by a water temperature sensor. The target cooling water temperature corresponding to the set duty may be a current air temperature, which is detected by the air temperature sensor and corresponds to the set duty, in the current cooling fan duty map.

In addition, the set duty may be 100%.

In addition, in comparing the current cooling water temperature with the target cooling water temperature corresponding to the set duty, the current cooling fan duty map may be a duty map, which has undergone a previous update or may be an initial duty map upon a release of a vehicle when no previous update was performed.

In addition, the duty map update condition may include a condition in which a current cooling fan duty for cooling fan control reaches a set duty. The duty map update condition may include, in a state in which the current cooling fan duty reaches the set duty, a condition in which the current cooling water temperature as the state variable exceeds the target cooling water temperature corresponding to the set duty on the current cooling fan duty map.

In addition, in determining the available power of the fuel cell stack for each cooling water temperature, the set data for each fuel cell stack deterioration may include output data of the fuel cell stack for each cooling water temperature at birth of life (BOL). The set data for each fuel cell stack deterioration may also include output data of the fuel cell stack for each cooling water temperature at end of life (EOL).

The controller may determine cooling fan consumption power for each cooling water temperature corresponding to the current fuel cell stack deterioration as set data for each fuel cell stack deterioration using data representing cooling fan consumption power for each cooling water temperature at BOL of the fuel cell stack, and using data representing cooling fan consumption power for each cooling water temperature at EOL of the fuel cell stack. The controller may also determine the available power of the fuel cell stack for each cooling water temperature using a stack power map representing the stack power according to the cooling water temperature and the determined cooling fan consumption power for each cooling water temperature.

In addition, the stack output map may be a map for limiting the stack power in a high-temperature situation in which the cooling water temperature is higher than a set temperature. Additionally, the stack output map may be a map in which the stack power is set to a value that gradually decreases as the cooling water temperature increases at the set temperature or higher.

In addition, the cooling fan consumption power for each cooling water temperature may be subtracted from the stack power for each cooling water temperature of the stack power map. The power obtained by subtracting the cooling fan consumption power from the stack power for each cooling water temperature may be determined as the available power of the fuel cell stack for each cooling water temperature.

In addition, the cooling fan duty map may be a map in which the cooling fan duty may be set to a value according to an air temperature and a cooling water temperature. In updating the cooling fan duty map, a cooling fan duty map value for a current air temperature detected by an air temperature sensor may be updated using a target cooling water temperature at which the available power of the fuel cell stack is maximized.

In addition, the method may further include determining a temperature difference between the target cooling water temperature at which the available power of the fuel cell stack is maximized, a current air temperature on an initial cooling fan duty map, and a target cooling water temperature corresponding to a 100% cooling fan duty. The current air temperature is input and stored in the controller. Updating the cooling fan duty map includes updating the cooling fan duty map by moving a cooling fan duty map value with respect to the current air temperature as much as the temperature difference based on a cooling water temperature axis.

In addition, after updating the cooling fan duty map, whenever the duty map update condition is satisfied during the driving of the cooling fan for the heat dissipation of the cooling water for the fuel cell stack, the controller may repeat determining the available power of the fuel cell stack for each cooling water temperature. The controller may also repeat determining the target cooling water temperature at which the available power of the fuel cell stack is maximized. Additionally, the controller may repeat updating the cooling fan duty map to perform an update of cooling fan duty map values for different air temperatures.

In addition, in the determining the target cooling water temperature at which the available power of the fuel cell stack is maximized, the cooling water temperature, at which available power of the fuel cell stack has a maximum value among available powers of the fuel cell stack for each cooling water temperature, may be determined as a target cooling water temperature. Additionally, when a plurality of cooling water temperatures having the same maximum value and having the same available power of the corresponding fuel cell stack exist among the available powers of the fuel cell stack for each cooling water temperature, a highest cooling water temperature among the plurality of cooling water temperatures may be determined as the target cooling water temperature.

In addition, the method of controlling a cooling fan for a fuel cell stack may further include determining, by the controller, a cooling fan duty corresponding to a current state variable using the updated cooling fan duty map. The method may further include performing, by the controller, PWM control on the fan motor of the cooling fan using the determined cooling fan duty.

In addition, in determining the cooling fan duty, the current state variable may include an air temperature detected by an air temperature sensor and a cooling water temperature detected by a water temperature sensor.

Other aspects and embodiments of the present disclosure are discussed below.

It should be understood that the terms "vehicle," "vehicular," or other similar terms as used herein are inclusive of motor vehicles in general. Such motor vehicles may include sports utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle that is both gasoline-powered and electric-powered.

The above and other features of the present disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein:

FIG. 1 is a diagram illustrating a relationship between a stack load and a stack heating value according to a stack use in a known fuel cell system;

FIG. 2 is a diagram illustrating an example in which stack power is limited according to a cooling water temperature in the known fuel cell system;

FIG. 3 is a diagram illustrating an example of setting a cooling fan duty according to an air temperature and the cooling water temperature in the known cooling system;

FIG. 4 is a diagram illustrating a correlation between the revolutions per minute (RPM) of a cooling fan and consumption power in the known cooling system;

Figure 5:
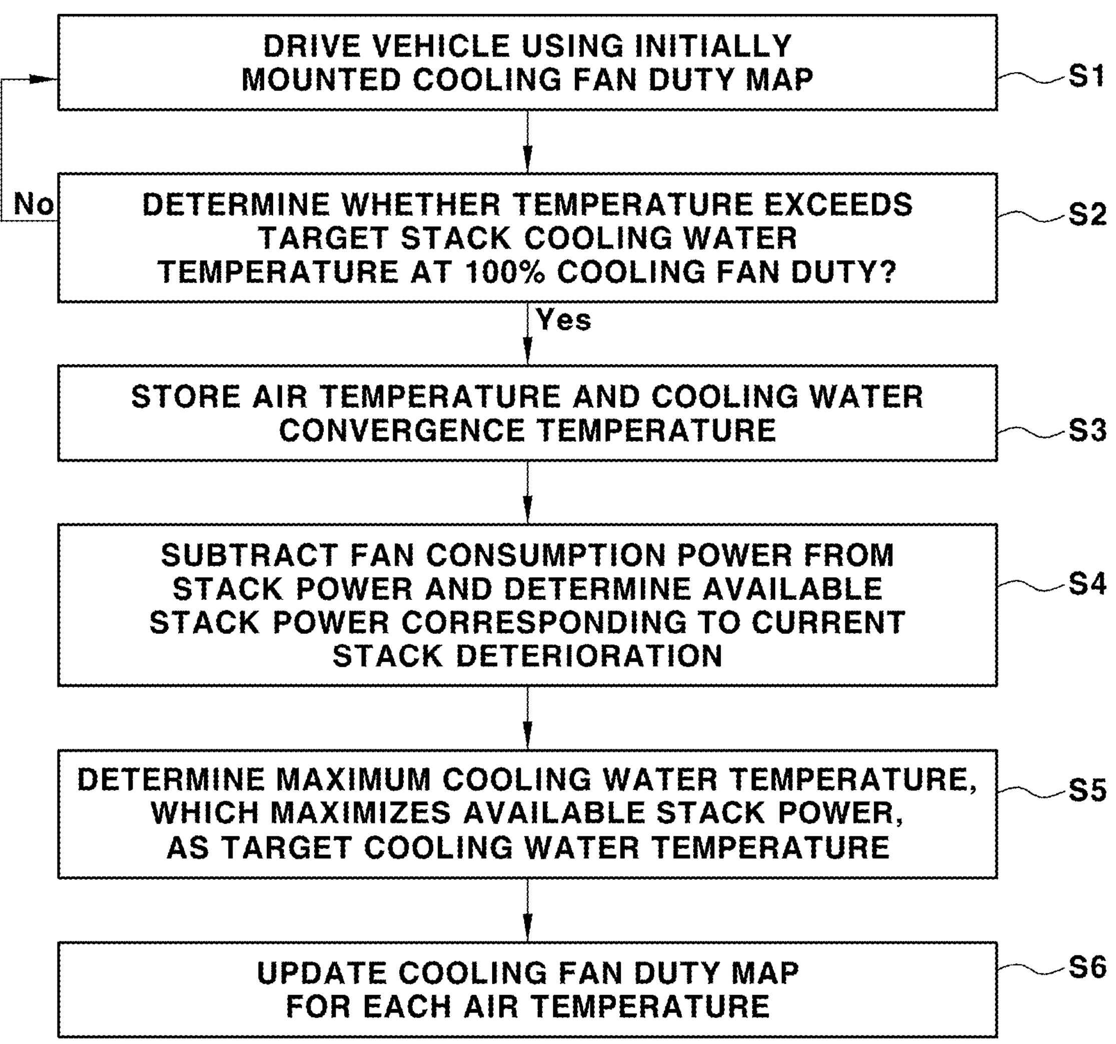
FIG. 5 is a flowchart illustrating a process of determining a duty for cooling fan control according to the present disclosure.

It should be understood that the appended drawings are not necessarily drawn to scale, and thus present a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structures or functional descriptions presented in the embodiments of the present disclosure are merely exemplified for the purpose of describing the embodiments according to the concept of the present disclosure. Thus, the embodiments according to the concept of the present disclosure may be implemented in various forms. In addition, the embodiments are not to be taken in a sense that limits the present disclosure to the specific embodiments, and should be construed to include modifications, equivalents, or substitutes within the spirit and technical scope of the present disclosure.

The terms first, second, and/or the like in the present disclosure may be used to describe various components, but the components are not limited by these terms. These terms may be used only for the purpose of distinguishing one component from another component. For example, a first component may be referred to as a second element, and similarly, the second component may also be referred to as the first component without departing from the scope of the present disclosure.

When a component is referred to as being "connected" or "coupled" to another component, it may be directly connected or coupled to another component. However, it should be understood that sill another component may be present between the component and another component. On the contrary, when a component is referred to as being "directly connected to," or "directly in contact with" another component, it should be understood that still another component may not be present between the component and another component. Other expressions describing the relationship between components, i.e., "between" and "immediately between," or "adjacent to" and "directly adjacent to" should also be construed as described above.

When a component, device, element, or the like of the present disclosure is described as having a purpose or performing an operation, function, or the like, the component, device, or element should be considered herein as being "configured to" meet that purpose or perform that operation or function.

Throughout the present specification, the same reference numerals indicate the same components. Terms used herein are intended to describe embodiments and are not intended to limit the present disclosure. In the present specification, the singular forms include the plural forms unless the context clearly dictates otherwise. It is noted that the terms "comprises" and/or "comprising" used herein does not exclude the presence or addition of one or more other components, steps, operations, and/or elements in addition to stated components, steps, operations, and/or elements.

A fuel cell vehicle is provided with a cooling system for temperature control of a fuel cell stack. The cooling system includes a cooling module for performing heat dissipation of cooling water, which cools the fuel cell stack. The cooling module includes a radiator for performing heat dissipation on the cooling water through heat exchange with air. The cooling module includes a cooling fan for suctioning air and passing the suctioned air through the radiator. As used herein, cooling water may include water, by definition, but may also include other suitable coolants and cooling fluids.

An electric cooling fan driven by a motor is used as the cooling fan of the cooling system in the fuel cell vehicle. In the electric cooling fan, the motor is driven to rotate a fan installed on a motor shaft.

Control of the electric cooling fan is performed such that a controller controls driving of the motor (hereinafter, referred to as a "fan motor"). In the following description, an operation, driving, a rotation, and revolutions per minute (RPM) of the cooling fan have the same meaning as an operation, driving, a rotation, and an RPM of the motor.

Driving control of the fan motor is performed such that the controller controls a current applied to the fan motor through pulse width modulation (PWM) control. In other words, when a state variable for controlling a cooling fan in a vehicle is detected and acquired by the controller, the controller controls driving of the fan motor based on the acquired real-time state variable. In this case, a speed and a driving state of the fan motor are controlled by controlling the current applied to the fan motor through a method of adjusting a duty of a PWM signal according to the state variable.

In this way, controlling the RPM of the cooling fan may be performed by controlling a duty of the PWM signal for controlling the current applied to the fan motor. In the following description, the duty of the cooling fan and the duty of the fan motor may mean the duty of the PWM signal for controlling the current applied to the fan motor of the cooling fan.

In addition, in the following description, duty control means the control for adjusting the duty of the PWM signal for controlling the RPM of the cooling fan and the RPM of the fan motor. The control of the RPM of the cooling fan, speed control of the fan motor, the duty control of the cooling fan, and the duty control of the fan motor may be understood as the same meaning.

As described above, during the cooling control of the fuel cell stack, the RPM of the cooling fan is controlled according to the state variable. The state variable for controlling the RPM of the cooling fan may include an air temperature and a cooling water temperature.

Thus, in determining the duty for the PWM control, a map in which a duty is set to a value according to the air temperature and the cooling water temperature may be used. In the duty map, the air temperature and the cooling water temperature are inputs and the duty is an output.

In other words, by using the duty map shown in FIG. 3, a duty value corresponding to a current air temperature and a current cooling water temperature may be determined. PWM control is performed on the fan motor of the cooling fan according to the determined duty value so that the RPM of the cooling fan may be controlled.

Hereinafter, a method of controlling a cooling fan according to the present disclosure is described in detail.

Figures 6, 7:
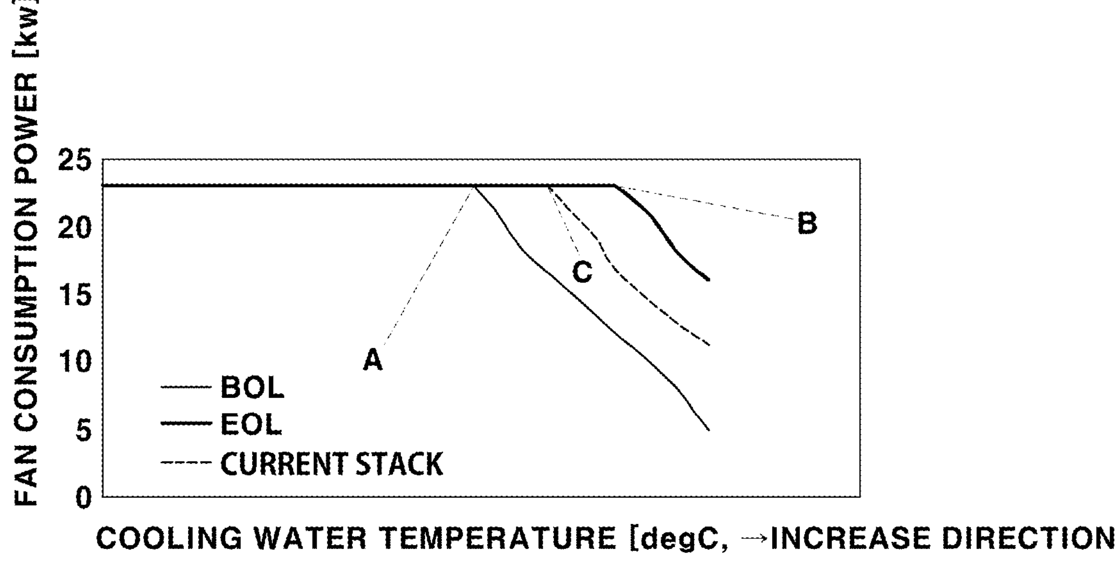
FIG. 6 is a block diagram illustrating a configuration of a device for performing the cooling fan control according to the present disclosure.
FIG. 7 is a diagram illustrating a fan consumption power map in the present disclosure.

FIG. 5 is a flowchart illustrating a process of determining a duty for cooling fan control according to the present disclosure. FIG. 6 is a block diagram illustrating a configuration of a device for performing the cooling fan control according to the present disclosure. FIG. 7 is a diagram illustrating a fan consumption power map in the present disclosure. In FIG. 6, an air temperature sensor 11 is a sensor for detecting an air temperature, and a water temperature sensor 12 is a sensor for detecting a cooling water temperature.

Figure 8:
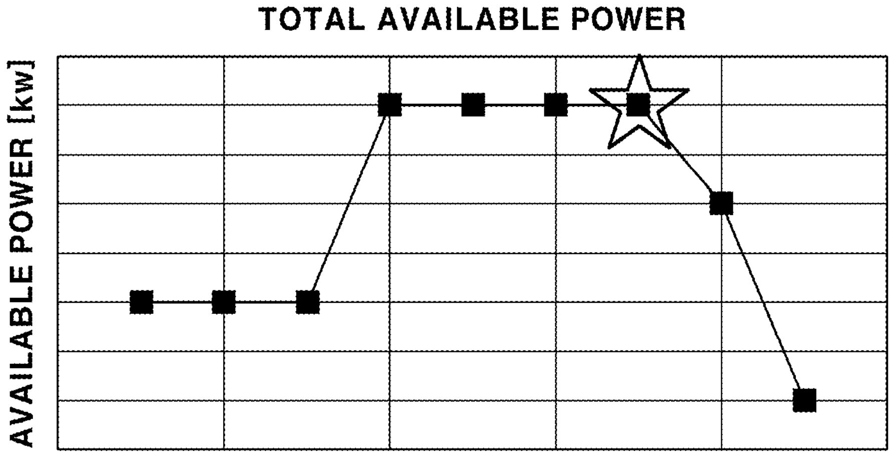
FIG. 8 is a diagram illustrating actual available power according to a cooling water temperature in the present disclosure.
Figure 9:
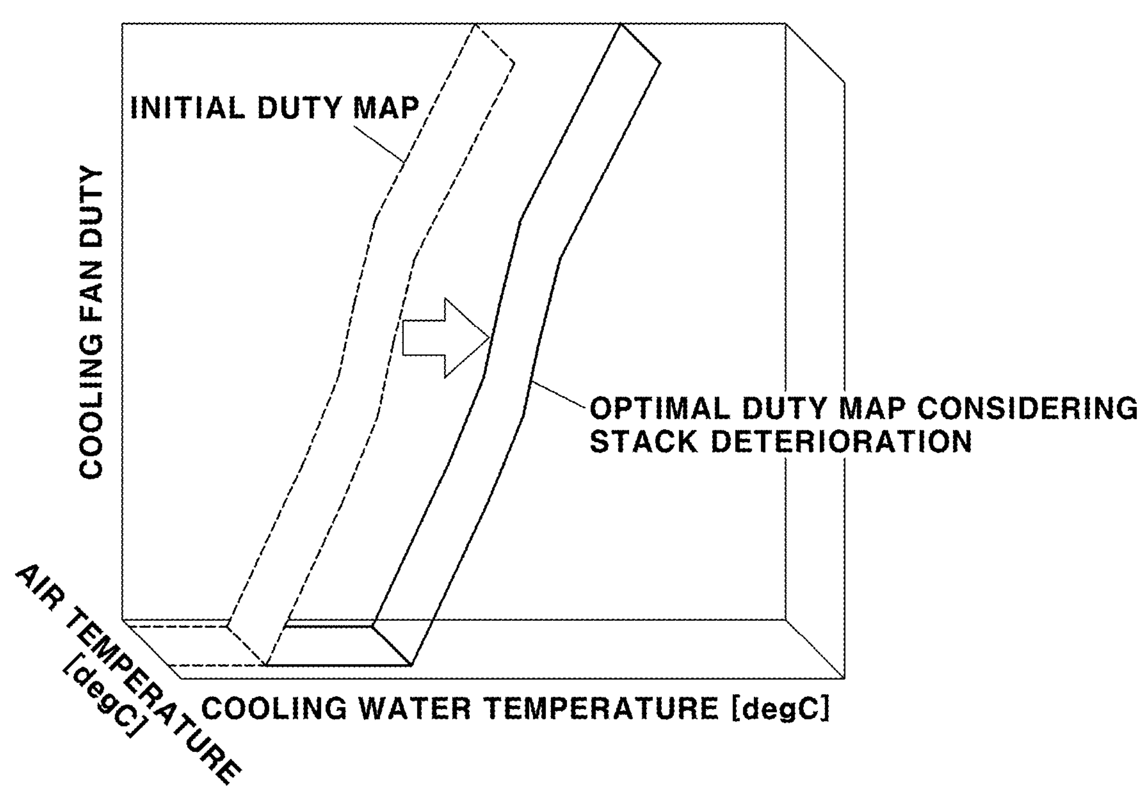
FIG. 9 is a diagram for describing an automatic update process of a cooling fan duty map for each cooling water temperature with respect to an air temperature in the present disclosure.

FIG. 8 is a diagram illustrating actual available power according to a cooling water temperature in the present disclosure. FIG. 9 is a diagram for describing an automatic update progress of a cooling fan duty map for each cooling water temperature with respect to an air temperature in the present disclosure.

The present disclosure relates to a method of controlling a cooling fan, which is capable of maximizing available stack power by reflecting current fuel cell stack deterioration. The present disclosure also includes a process of determining a cooling fan duty in order to maximize the available stack power, and a process of performing PWM control on a fan motor of a cooling fan 30 using the determined cooling fan duty.

In addition to the above processes, the present disclosure further includes a process of updating a cooling fan duty map with a new duty value capable of maximizing the available stack power according to the current fuel cell stack deterioration.

In the present disclosure, an optimal cooling fan duty to which the current fuel cell stack deterioration is reflected is determined using the updated cooling fan duty map. The cooling fan 30 is controlled using the determined cooling fan duty so that the available stack power may be maximized.

A fuel cell vehicle is released with an initial duty map, which is optimized to maximize the available stack power based on the beginning of life (BOL), stored in a controller 20. When the fuel cell vehicle is initially traveling after the release of the fuel cell vehicle, the initial duty map based on BOL is used to control an RPM of the cooling fan 30.

Thus, even in the present disclosure, since durability of the fuel cell stack is in a BOL state during the initial traveling of the fuel cell vehicle, a duty for PWM control of the cooling fan (fan motor) 30 is determined using an optimal duty map for maximizing the available stack power based on the BOL state. Accordingly, the RPM of the cooling fan 30 is controlled.

In this case, the initial duty map is a map in which a duty value of the fan motor, which is for controlling the cooling fan 30 with a target optimal RPM based on the BOL state (a duty value for the PWM control of the fan motor) is set to a value according to the air temperature and the cooling water temperature in advance to traveling. The initial duty map may be setting data for defining a correlation between an air temperature, a cooling water temperature, and a duty at BOL.

As the vehicle travels, the stack undergoes degradation or deterioration. However, it is important to note that such deterioration cannot be generalized solely based on mileage. Thus, as stack deterioration progresses over time, it becomes difficult to maintain optimal control when the one duty map mounted at the initial release state of the vehicle is continuously used.

For example, when the vehicle is a bus, the fuel cell stack may be operated with relatively high or low power according to a driving route, a driving habit of the driver, or whether it is an express bus or a city bus. In this case, heat generation is different according to the stack power, thus making it necessary to perform optimization of the duty map in consideration of a driving environment that is different from when the initial duty map was set during vehicle traveling.

However, when the vehicle is initially traveling after the release of the vehicle and the initial duty map mounted at the time of the release is a duty map configured to maximize the available stack power based on the BOL of the fuel cell stack, the cooling fan 30 may be controlled using the initial duty map that is optimized based on the BOL. In the duty map, the duty (duty rate) may be set to a value ranging from 0% to 100% according to the air temperature and the cooling water temperature.

However, the fuel cell stack gradually deteriorates while the vehicle is traveling. Therefore, in the present disclosure, based on the initial duty map optimized to maximize the available stack power based on the BOL, duty optimization is performed to update the initial duty map with a map value to which the current stack deterioration is reflected.

In this case, by updating the duty value for each cooling water temperature at various air temperatures to a value capable of maximizing the available stack power in the current stack deterioration, optimization of the cooling fan (fan motor) duty for each air temperature according to the stack deterioration is performed. A more detailed description of the above process is as follows.

First, while the cooling fan is driven when the vehicle is traveling, the controller 20 determines whether an update condition of a predetermined cooling fan duty map is satisfied based on a current state variable for controlling the cooling fan 30.

The state variable is real-time detection information detected by a sensor in the vehicle and collected by the controller 20. The state variable may include an air temperature detected by the air temperature sensor 11 and a cooling water temperature detected by the water temperature sensor 12.

To describe the process of determining whether the update condition is satisfied in detail, the controller 20 determines whether a current cooling fan duty reaches a predetermined set duty. When the current cooling fan duty reaches the set duty, the controller 20 compares the current cooling water temperature detected by the water temperature sensor 12 with a target cooling water temperature at the set duty on the current duty map.

In this case, when the duty of the PWM controlled cooling fan reaches the set duty, but a current actual cooling water temperature exceeds the target cooling water temperature at the set duty on the duty map, the controller 20 stores and memorizes the air temperature and the cooling water temperature detected by the sensors 11 and 12 at a time point when the cooling water temperature converges.

The set duty may be set to 100% which is a maximum duty. In other words, when the cooling fan duty reaches 100%, which is the set duty, but the actual cooling water temperature at this time exceeds the target cooling water temperature at 100% duty on the duty map, the controller 20 stores the converged cooling water temperature and air temperature at the time point when the cooling water temperature converges.

In this case, the duty map is the current duty map on which a previous update was performed. When the duty map is not updated after the vehicle release and during initial traveling, the current duty map becomes the initial duty map stored in the controller 20 when the vehicle is released.

In addition, the target cooling water temperature at the set duty is a value corresponding to the set duty and the current air temperature detected by the air temperature sensor 11. Additionally, the target cooling water temperature is a cooling water temperature set on the current duty map. For example, when the set duty is 100%, the target cooling water temperature is the cooling water temperature set as a 100% duty and the current air temperature in the duty map.

In addition, the actual cooling water temperature is the cooling water temperature detected by the water temperature sensor 12. The controller 20 acquires real-time cooling water temperature information from a signal of the water temperature sensor 12 and compares the real-time cooling water temperature information with the target cooling water temperature at the 100% duty.

When the cooling water temperature actually detected in the vehicle is higher than the target cooling water temperature, it may be a situation in which, even when the cooling fan 30 is driven at the 100% duty, which is the maximum duty, the cooling water temperature rises due to an insufficient amount of cooling.

Generally, it is difficult to unconditionally mount a large cooling fan in order to increase cooling performance in the vehicle. A limit of a mounting size of the cooling fan is determined in consideration of a mounting condition or noise, vibration, harshness (NVH) in the vehicle.

Therefore, even when the cooling fan 30 is controlled at the 100% duty that is the maximum duty, when the cooling water temperature rises, it is reasonable to correct the target cooling water temperature at the 100% duty according to the stack deterioration. When the target cooling water temperature is not corrected, a situation in which only the power is consumed unnecessarily by the cooling fan 30 occurs.

Thus, in the present disclosure, when the cooling fan duty reaches the set duty and the actual cooling water temperature detected by the water temperature sensor 12 exceeds the target cooling water temperature at the set duty on the duty map, this condition may be an updated condition of the cooling fan duty map.

As described above, after the update condition is satisfied and the converged cooling water temperature and air temperature are stored, by using the converged cooling water temperature (hereinafter, referred to as a "cooling water convergence temperature"), a duty optimization process of determining an optimal duty for each air temperature and each cooling water temperature is performed. The duty optimization process is capable of maximizing the available stack power in the current stack deterioration.

In the embodiment of the present disclosure, the controller 20 may calculate the available power of the fuel cell stack based on the cooling water convergence temperature stored at the convergence time point of the cooling water temperature. In this case, in addition to the cooling water convergence temperature, the controller 20 may calculate the available power using both a stack power map and a cooling fan consumption power map.

The stack power map (derating map), as shown in FIG. 2, may be a map in which stack power (KW) is set to a value corresponding to the cooling water temperature (° C.). Referring to FIG. 2, the derating map defines a correlation between the cooling water temperature and the stack power.

According to the illustrated derating map as the stack power map, it can be seen that when the cooling water temperature rises to be equal to the set temperature or higher, the stack power is forcibly derated to protect the fuel cell stack.

In addition, in order to calculate the available power of the fuel cell stack, data is input and stored in the controller 20 in advance. In the data, cooling fan consumption power is set for each cooling water temperature with respect to a BOL stack and an EOL stack, i.e., a fan consumption power map in which a cooling fan consumption power is set to a value corresponding to the cooling water temperature.

In the fan consumption power map, the cooling fan consumption power may be consumption power when a duty is the set duty. When the set duty is 100%, the cooling water temperature becomes the target cooling water temperature at a 100% cooling fan duty.

FIG. 7 is a diagram illustrating a fan consumption power map in the present disclosure that shows data in which the cooling fan consumption power at the 100% duty is set to a value according to the target cooling water temperature. In the fan consumption power map of FIG. 7, a horizontal axis represents the target cooling water temperature (° C.), and a vertical axis represents the cooling fan consumption power (KW) at the 100% duty.

Referring to FIG. 7, it can be seen that the fan consumption power map includes fan consumption power data at BOL and fan consumption power data at EOL of the fuel cell stack as set data for each fuel cell stack deterioration.

In other words, as shown in FIG. 7, in the embodiment of the present disclosure, the fan consumption power map, which is the set data for each fuel cell stack deterioration, may include a graph (map) showing the cooling fan consumption power according to the cooling water temperature at BOL of the fuel cell stack, and may include a graph (map) showing the cooling fan consumption power according to the cooling water temperature at EOL of the fuel cell stack.

In the fan consumption power map of FIG. 7, the graph at BOL and the graph at EOL are shown at coordinates with the cooling water temperature (° C.) as the horizontal axis and the cooling fan consumption power (KW) as the vertical axis. Referring to FIG. 7, it can be seen that the fan consumption power at EOL and BOL of the fuel cell stack is set to a value corresponding to the cooling water temperature in each graph.

In FIG. 7, data of the graph at BOL and data of the graph at EOL, including values "A" and "B," are set data acquired as a result of conducting a preliminary test and evaluation with respect to a BOL stack and an EOL stack. The BOL stack and the EOL stack have the same specification that differs only in deterioration at the development stage of the vehicle and fuel cell system. This is input and stored in the controller 20 in advance of the vehicle traveling and used to determine fan consumption power for each cooling water temperature corresponding to the current stack deterioration.

Value "A" is a convergence temperature of the cooling water during a continuous output of the BOL stack. Value "A" represents a target cooling water temperature, which is the cooling water convergence temperature, while the driving of the cooling fan is controlled at the set duty as the cooling fan duty, i.e., the 100% duty that is the maximum duty.

In addition, value "B" is a convergence temperature of the cooling water during a continuous output of the EOL stack. Value "B" represents a target cooling water temperature, which is the cooling water convergence temperature, while the driving of the cooling fan is controlled at the set duty as the cooling fan duty, i.e., the 100% duty that is the maximum duty.

Value "C" in FIG. 7 is the cooling water temperature converged in a current stack deterioration state. Additionally, value "C" is the current cooling water convergence temperature stored in the controller 20 when the update condition of the cooling fan duty map is satisfied, and becomes the target cooling water temperature at the 100% cooling fan duty corresponding to the current stack deterioration.

As shown in FIG. 7, the cooling water temperature "C" is positioned between "A" and "B," which are the cooling water temperatures under the same fan consumption power (100% duty) condition. Since value "A" is the target cooling water temperature at the 100% duty in the BOL state of the stack, and value "B" is the target cooling water temperature at the 100% duty in the EOL state of the stack, the cooling water convergence temperature "C" according to the current stack deterioration becomes the cooling water temperature between values "A" and "B" at the same 100% duty.

In the fan consumption output map of FIG. 7, all values of the fan consumption power at the cooling water temperatures "A," "B," and "C" are the same. Value "C" is positioned at a position corresponding to the current stack deterioration between the cooling water temperatures "A" and "B" with the same fan consumption power.

In other words, when the update condition is satisfied and the cooling water convergence temperature "C," i.e., the cooling water temperature "C" converged at the 100% cooling fan duty, is obtained, the controller 20 may compare the cooling water convergence temperature "C" with the target cooling water temperature "A" at BOL and the target cooling water temperature "B" at EOL. The controller 20 may also obtain cooling fan consumption output data in a cooling water temperature section of "C" or higher, in which the current stack deterioration and the current state are reflected, from the cooling water temperatures "A," "B," and "C."

In this case, the fan consumption power graph corresponding to the current stack deterioration may be obtained as a graph having a start point of the cooling water temperature "C" between the fan consumption power graph at BOL and the fan consumption power graph at EOL.

Referring to the fan consumption power map of FIG. 7, it can be seen that, under the same fan consumption power condition, the target cooling water temperature "C" at EOL after stack deterioration progresses is higher than the target cooling water temperature "A" at BOL, which is the initial state of the stack. Additionally, it can be seen that the target cooling water temperature "C," while deterioration progresses from the initial state of the stack, is positioned between "A" and "B." This is the same in a temperature section above "C."

In other words, when the comparison is performed under the same stack fan consumption power condition, the cooling water temperature corresponding to the current stack deterioration is positioned between the cooling water temperature at BOL and the cooling water temperature at EOL.

In addition, even in the deterioration between BOL and EOL, in the temperature section above "C," the graph showing the fan consumption power according to the cooling water temperature represents a form in which, as the fan consumption power becomes lower, the cooling water temperature rises. In other words, the graph demonstrates a decreasing trend in fan consumption power, as the cooling water temperature increases from a start point "C."

As described above, information representing the correlation between the fan consumption power corresponding to the current stack deterioration and the cooling water temperature in the temperature section above "C" may be obtained using the graph with "C" as a starting point.

More specifically, the controller 20 may obtain a fan consumption power graph for each cooling water temperature corresponding to the current stack deterioration in the form of a graph with "C" as a starting point. By using the information representing the temperature relationship of "C" with respect to "A" and "B," which are the cooling water temperatures under the same fan consumption power condition, the controller 20 may obtain the cooling water temperature for each fan consumption power corresponding to the current stack deterioration as a value between the graph at BOL and the graph at EOL.

In this case, as one example of an obtaining method, when "A," "B," and "C" are the cooling water temperatures at the same fan consumption power as in FIG. 7, and when "(C−A)/(B−A)=k" is defined, a cooling water temperature "C1" for each fan consumption power in FIG. 7 corresponding to the current stack deterioration in the temperature section above "C" may be obtained by the controller 20. The cooling water temperature "C1" may be obtained by the controller 20 utilizing the following equation 1 using "A1" that is a cooling water temperature at BOL and "B1" that is a cooling water temperature at EOL at the same fan consumption power, and value k.

$$C1=(B1-A1)\times k+A1 \quad \text{[Equation 1]}$$

As described above, when the cooling water temperature for each fan consumption power corresponding to the current stack deterioration is calculated and the fan consumption power graph for each cooling water temperature is obtained in the temperature section above "C," by using the derating map data of FIG. 2 and the fan consumption power map data of FIG. 7, the controller 20 derives power available in the vehicle for each target cooling water temperature. FIG. 2 defines the correlation between the cooling water temperature and the stack power. FIG. 7 defines the correlation between the cooling water temperature and the fan consumption power according to the current stack deterioration.

This may derive an optimal cooling water temperature (the target cooling water temperature) capable of maximizing the stack power that can be provided to the vehicle. Subtracted results are obtained such that the fan consumption power for each cooling water temperature, which is set in the fan consumption power map, is subtracted from the stack power for each cooling water temperature of the derating map. Additionally, the fan consumption power at the same cooling water temperature is subtracted from the stack power for each corresponding cooling water temperature.

In this way, the power obtained by subtracting the fan consumption power for each cooling water temperature from the stack power under the same cooling water temperature condition becomes the actual available stack power for each cooling water temperature corresponding to the current stack deterioration.

As described above, when the actual available stack power for each cooling water temperature is determined, the controller 20 determines the cooling water temperature that corresponds to the maximum available stack power as a new target cooling water temperature. In this case, it is possible to encounter situations where the maximum available power is the same for different cooling water temperatures. In other words, there may be situations where the available power values at different cooling water temperatures are the same and the available power values at the different cooling water temperatures may be maximum values.

In this case, the highest cooling water temperature (maximum cooling water temperature) among the cooling water temperatures exhibiting the same maximum available power is determined as the target cooling water temperature. This may set the target cooling water temperature with a relatively small RPM of the cooling fan in consideration of the NVH.

In this way, when a new target cooling water temperature is determined at a time point when the cooling fan duty reaches a 100% duty, the controller 20 updates the cooling fan duty map value. The controller 20 updates the cooling fan duty map value by using the new target cooling water temperature derived through the above-described cooling fan duty optimization process.

In this case, the cooling fan duty map value for the current air temperature is corrected. In order to correct the cooling fan duty map value, the cooling fan duty value at the current air temperature is shifted (e.g., moved) along the cooling water temperature axis by the amount of change in the new target cooling water temperature based on the target cooling water temperature of the initial duty map.

An amount of change in the target cooling water temperature becomes a temperature difference between a target cooling water temperature at which the available power of the fuel cell stack is maximized, a current air temperature on the initial duty map, and a target cooling water temperature corresponding to the 100% cooling fan duty. The current air temperature is input and stored in the controller 20.

Then, whenever the update condition of the cooling fan duty map is satisfied, the controller 20 performs the cooling fan duty optimization process to derive a new target cooling water temperature (a target cooling water temperature corresponding to the current stack deterioration). The controller 20 then continuously and repetitively performs a process of correcting the cooling fan duty map value for each cooling water temperature with respect to the current air temperature using the new target cooling water temperature while the vehicle is traveling.

In addition, as described above, when the cooling fan duty map is updated, the controller 20 may determine a duty value corresponding to the current air temperature and the current cooling water temperature from the updated cooling fan duty map. The controller 20 may perform the PWM control on the fan motor of the cooling fan 30 using the determined duty value.

As described above, according to the present disclosure, the automatic correction and updating of cooling fan duty map value for various air temperatures may be performed. Consequently, different cooling fan duty maps capable of maximizing available stack power by reflecting the current stack deterioration according to vehicle conditions and characteristics of each vehicle, such as the driving habit of the driver or a driving route, may be automatically configured for each air temperature.

In addition, according to the present disclosure, the cooling fan duty map, which maximizes available power by reflecting characteristics of the driver and the vehicle and the current stack deterioration, is automatically updated so that power usable by the vehicle can be maximized.

In accordance with a method of controlling a cooling fan for a fuel cell stack according to the present disclosure, there is an effect that can maximize available stack power through optimal duty control of a cooling fan by considering deterioration of the fuel cell stack.

In particular, the automatic correction and updating of the cooling fan duty map value for various air temperatures can be performed. Consequently, different cooling fan duty maps capable of maximizing available stack power by reflecting the current stack deterioration according to vehicle conditions and characteristics of each vehicle, such as the driving habit of the driver or a driving route, can be automatically configured for each air temperature.

Although the embodiments of the present disclosure have been described in detail, the scope of the prevent disclosure is not limited to these embodiments. Various modifications and improvements devised by those having ordinary skill in the art using the fundamental concept of the present disclosure, which is defined by the appended claims, further fall within the scope of the present disclosure.

What is claimed is:

1. A method of controlling a cooling fan for a fuel cell stack, the method comprising:

determining, by a controller, whether a predetermined duty map update condition is satisfied based on a state variable for cooling fan control during driving of a cooling fan for cooling water heat dissipation of a fuel cell stack;

when the duty map update condition is satisfied, determining, by the controller, available power of the fuel cell stack for each cooling water temperature corresponding to a current fuel cell stack deterioration, the current fuel cell stack deterioration corresponding to current fuel cell stack deterioration based on a current cooling water temperature and set data for each fuel cell stack deterioration;

determining, by the controller, a target cooling water temperature at which available power of the fuel cell stack is maximized from the determined available power of the fuel cell stack for each cooling water temperature; and updating, by the controller, a cooling fan duty map for pulse width modulation (PWM) control of the cooling fan using the target cooling water temperature at which the determined available power of the fuel cell stack is maximized.

2. The method of claim 1, wherein determining whether the duty map update condition is satisfied includes:

determining whether a current cooling fan duty for cooling fan control reaches a set duty;

when the current cooling fan duty reaches the set duty, comparing the current cooling water temperature as the state variable with a target cooling water temperature corresponding to the set duty on a current cooling fan duty map; and when the current cooling water temperature exceeds the target cooling water temperature, determining that the duty map update condition is satisfied.

3. The method of claim 2, wherein:

the cooling fan duty map is a map in which the cooling fan duty is set to a value according to the state variable;

in the cooling fan duty map, the state variable includes an air temperature detected by an air temperature sensor and a cooling water temperature detected by a water temperature sensor; and the target cooling water temperature corresponding to the set duty is a current air temperature, which is detected by the air temperature sensor and corresponds to the set duty, in the current cooling fan duty map.

4. The method of claim 2, wherein the set duty is 100%.

5. The method of claim 2, wherein, in the comparing of the current cooling water temperature with the target cooling water temperature corresponding to the set duty, the current cooling fan duty map is a duty map which has undergone a previous update or is an initial duty map upon a release of a vehicle when no previous update was performed.

6. The method of claim 1, wherein the duty map update condition includes:

a condition in which a current cooling fan duty for cooling fan control reaches a set duty; and in a state in which the current cooling fan duty reaches the set duty, a condition in which the current cooling water temperature as the state variable exceeds the target cooling water temperature corresponding to the set duty on the current cooling fan duty map.

7. The method of claim 1, wherein, in determining the available power of the fuel cell stack for each cooling water temperature, the set data for each fuel cell stack deterioration includes:

output data of the fuel cell stack for each cooling water temperature at beginning of life (BOL); and output data of the fuel cell stack for each cooling water temperature at end of life (EOL).

8. The method of claim 7, wherein the controller is configured to:

determine cooling fan consumption power for each cooling water temperature corresponding to the current fuel cell stack deterioration as set data for each fuel cell stack deterioration using data representing cooling fan consumption power for each cooling water temperature at BOL of the fuel cell stack and using data representing cooling fan consumption power for each cooling water temperature at EOL of the fuel cell stack; and determine the available power of the fuel cell stack for each cooling water temperature using a stack power map representing the stack power according to the cooling water temperature and the determined cooling fan consumption power for each cooling water temperature.

9. The method of claim 8, wherein the stack output map is a map for limiting the stack power in a high-temperature situation in which the cooling water temperature is higher than a set temperature and is a map in which the stack power is set to a value that gradually decreases as the cooling water temperature increases at the set temperature or higher.

10. The method of claim 8, wherein the cooling fan consumption power for each cooling water temperature is subtracted from the stack power for each cooling water temperature of the stack power map, and wherein the power obtained by subtracting the fan consumption power from the stack power for each cooling water temperature is determined as the available power of the fuel cell stack for each cooling water temperature.

11. The method of claim 8, wherein:

the cooling fan duty map is a map in which the cooling fan duty is set to a value according to an air temperature and a cooling water temperature; and in the updating of the cooling fan duty map, a cooling fan duty map value for a current air temperature detected by an air temperature sensor is updated using a target cooling water temperature at which the available power of the fuel cell stack is maximized.

12. The method of claim 11, further comprising:

determining a temperature difference between the target cooling water temperature at which the available power of the fuel cell stack is maximized, a current air temperature on an initial cooling fan duty map, and a target cooling water temperature corresponding to a 100% cooling fan duty, wherein the current air temperature is input and stored in the controller, and wherein updating the cooling fan duty map includes updating the cooling fan duty map by moving a cooling fan duty map value with respect to the current air temperature as much as the temperature difference based on a cooling water temperature axis.

13. The method of claim 11, wherein, after updating the cooling fan duty map, whenever the duty map update condition is satisfied during the driving of the cooling fan for the heat dissipation of the cooling water for the fuel cell stack, the controller repeats:

determining the available power of the fuel cell stack for each cooling water temperature;

determining the target cooling water temperature at which the available power of the fuel cell stack is maximized; and updating the cooling fan duty map to perform an update of cooling fan duty map values for different air temperatures.

14. The method of claim 1, wherein, in determining the target cooling water temperature at which the available power of the fuel cell stack is maximized, the cooling water temperature, at which available power of the fuel cell stack has a maximum value among available powers of the fuel cell stack for each cooling water temperature, is determined as a target cooling water temperature, and, when a plurality of cooling water temperatures having the same maximum value and having the same available power of the corresponding fuel cell stack exist among the available powers of the fuel cell stack for each cooling water temperature, a highest cooling water temperature among the plurality of cooling water temperatures is determined as the target cooling water temperature.

15. The method of claim 1, further comprising:

determining, by the controller, a cooling fan duty corresponding to a current state variable using the updated cooling fan duty map; and performing, by the controller, PWM control on a fan motor of the cooling fan using the determined cooling fan duty.

16. The method of claim 15, wherein, in the determining of the cooling fan duty, the current state variable includes an air temperature detected by an air temperature sensor and a cooling water temperature detected by a water temperature sensor.

* * * * *